United States Patent [19]

Honauer

[11] 3,991,429
[45] Nov. 16, 1976

[54] APPARATUS FOR SHARPENING EDGES OF SKIS

[76] Inventor: Emil Honauer, Reussfeld, 6037 Root, Lucerne, Switzerland

[22] Filed: Sept. 2, 1975

[21] Appl. No.: 609,610

Related U.S. Application Data

[63] Continuation-in-part of Ser. No. 532,694, Dec. 13, 1974, abandoned.

[30] Foreign Application Priority Data

Dec. 13, 1973 Switzerland.................... 17485/73

[52] U.S. Cl................................. 7/14.1 R; 29/80; 76/83
[51] Int. Cl.² ...................... B25F 1/00; B21K 17/00
[58] Field of Search............................ 76/83, 86, 88; 51/205 WG, 228; 29/78, 80; 280/11.37 T; 15/236 R; 7/14.1 R, 17

[56] References Cited
UNITED STATES PATENTS

| 3,561,169 | 2/1971 | Pirzek ................................. 76/88 X |
| 3,670,601 | 6/1972 | Weeks ................................. 76/83 |
| 3,714,743 | 2/1973 | Hall............................... 51/205 WG |
| 3,762,046 | 5/1971 | Kolomick.......................... 29/80 X |
| 3,766,649 | 10/1973 | Winbauer .......................... 76/86 X |
| 3,837,123 | 9/1974 | Bradbury ........................... 76/88 X |
| 3,875,825 | 4/1975 | Buttafuoco .......................... 76/83 |

FOREIGN PATENTS OR APPLICATIONS

| 463,503 | 3/1950 | Canada ........................... 15/236 R |
| 1,186,380 | 1/1965 | Germany ............................. 76/88 |

Primary Examiner—Al Lawrence Smith
Assistant Examiner—Nicholas P. Godici
Attorney, Agent, or Firm—Roylance, Abrams, Berdo & Kaul

[57] ABSTRACT

A holder for a ski sharpening file includes a U-shaped elongated body, one leg of the U being longer than the other, the longer leg being provided with means for holding a flat file on its inwardly facing surface. The shorter leg acts as a guide bar or rib which is spaced from the file, the end of the shorter leg acting as a guide surface to be placed against the edge of the ski while filing the bottom or contact surface thereof. A handle is disposed on the outside surface of the body, the body also including an extension beyond the file retaining leg to partially support the handle. In a further embodiment a rim surrounds the file which is retained by springs. A handle projects laterally from the outer surface of the longer leg and holds a scraper.

4 Claims, 6 Drawing Figures

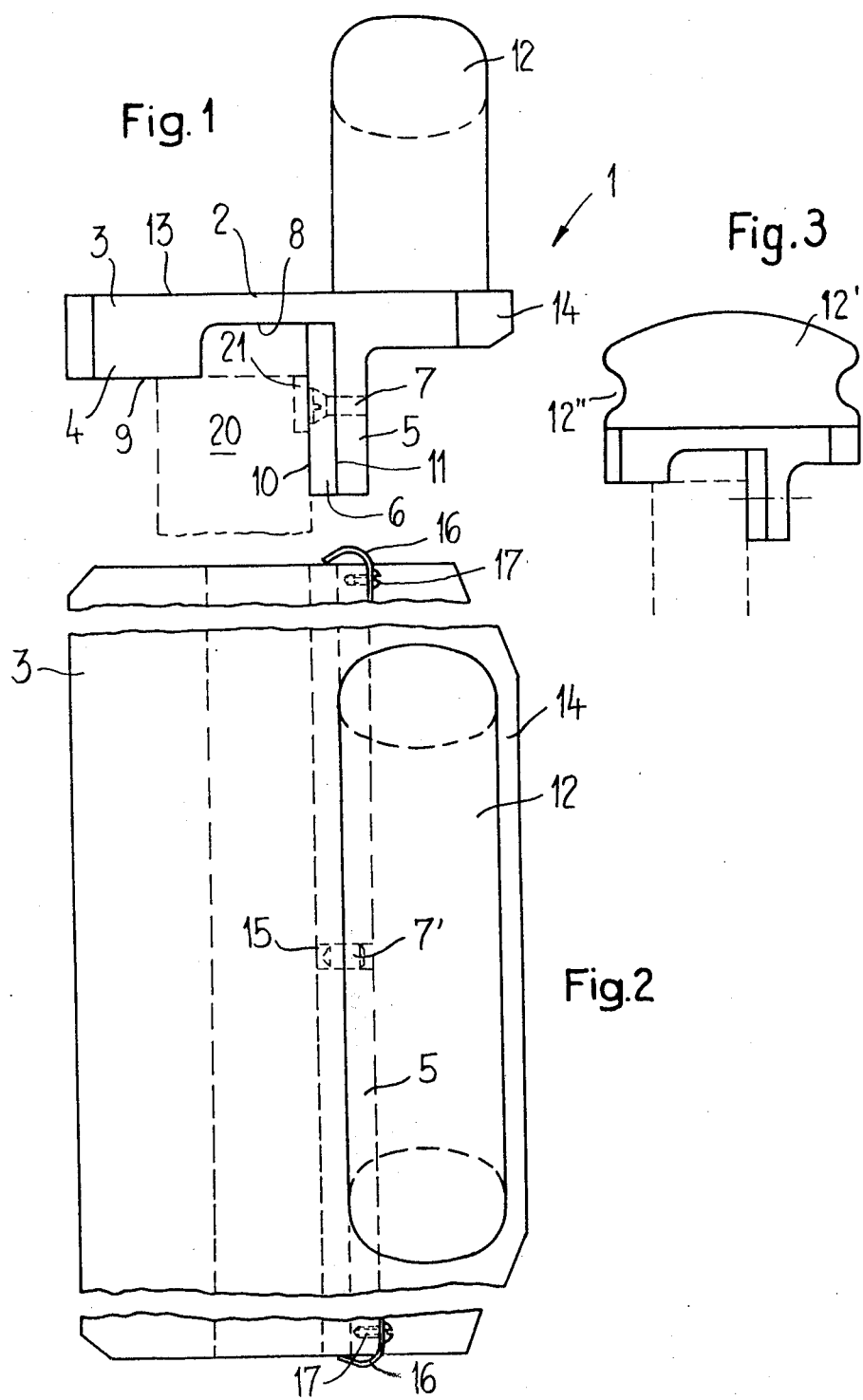

APPARATUS FOR SHARPENING EDGES OF SKIS

This is a continuation-in-part of U.S. Pat. application Ser. No. 532,694, filed Dec. 13, 1974, and now abandoned.

This invention relates to an apparatus for sharpening edges and, more particularly, to an apparatus for dressing the edges of skis.

When sharpening the edges of skis, it is well known to use a flat file. One flat side of the file, which can also be slightly rounded, is used for manually sharpening the edge of a ski. A disadvantge of this technique is that the precision with which the ski is sharpened is almost entirely a function of the skill of the person wielding the file. The technology of ski manufacture has been developed to such a state that it is highly important that the metal edge thereof be machined or dressed exactly as it was in the original state. Clearly, it is highly desirable for this machining to be done by the skier himself to avoid the delay and expense of having such dressing accomplished by an expert, with also the attendant delays.

Accordingly, it is an object of the present invention to provide an apparatus for sharpening the edges of skis whereby one who is not an expert can satisfactorily sharpen the edges of his skis whenever this becomes necessary.

Briefly described, the invention includes an apparatus for sharpening the edges of skis comprising a file, and a holder for the file comprising an elongated U-shaped body, and means for removably attaching the file to the inwardly facing surface of a longer one of the legs of the U-shaped body with the long dimension of the file extending parallel to the long dimension of the body, the distal end of the shorter leg forming a guide surface to guide the action of the file along the surface of the ski to be sharpened. A handle is provided on an outer surface of the body to facilitate gripping thereof and the body can additionally be formed with an extension on the opposite side of the file retaining leg to facilitate support of the handle and control of the body during the filing operation.

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a side elevation of one embodiment of a sharpening apparatus according to the invention;

FIG. 2 is a plan view of the apparatus of FIG. 1, with modifications;

FIG. 3 is a side elevation of a second embodiment with a modified handle;

Figure 4:
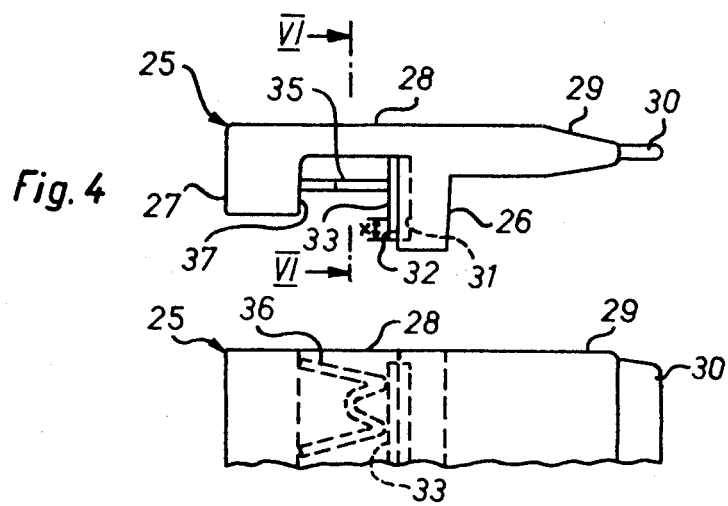
FIG. 4 is a side elevation of a third embodiment of a sharpening apparatus according to the invention.

As shown in FIG. 1, one embodiment of the apparatus includes a holder body 2 which is conveniently formed from plastic but which can also be made from another material such as metal. Body 2 also includes a leg 5 and a leg 3 which are integrally formed substantially perpendicular to each other to form an L-shaped body. Leg 5 is provided as a support for a file 6 which is attached to leg 5 by a screw 7 or a bolt 7' as shown in FIG. 2. The file can thus be easily replaced by removal of this single fastener. File 6 is in contact with the inwardly facing surface of leg 5 and abuts the inwardly facing surface 8 of leg 3. A ridge or bar 4 extends along the edge of leg 3 parallel to and spaced from the file. This bar can be integrally formed with leg 3 so that there is a space between the active surface 10 of the file and the bar, the bar thus forming a guide surface 9 to assist in the proper positioning and path of travel of the file. With the incorporation of bar 4 the body can be viewed as being U-shaped with one leg of the U being longer than the other, the longer leg holding the file.

It will be observed that the angle between the legs 3 and 5 in FIGS. 1 and 3 is 90°. If file 6 is a flat file with parallel flat sides 10 and 11, the angle between surface 10 and guide surface 9 will also be 90°. If it is necessary to use an angle other than 90° between surfaces 9 and 10, the angle between legs 3 and 5 can be altered or the file 6 can be replaced by one having opposite surfaces which are inclined with respect to each other rather than being parallel. It will also be observed that the provision of the recess defined by surface 8 of leg 3, the inwardly facing surface of leg or bar 4 and the file permits the sharpening device to be tilted slightly to permit sharpening the edge of a ski on which the relationship between the edges does not exactly form a right angle.

The holder 2 is provided with a handle 12 which is securely fastened to, or formed integrally with, the holder on the outside surface of leg 3. Leg 3 can also be provided with a projection 14 which extends across the opposite side of leg 5 so that the handle 12 is at least partly supported on the projection 14. The position of handle 12 on the outside surface 13 of leg 3 is selected so that tilting of the holder 2 is avoided. The shape of the handle can be selected to provide a firm grip on the holder.

As shown in FIG. 1, the device is used in conjunction with a ski 20 having an edge 21 to be sharpened. The flat side of file 6 is placed in contact with the contact surface of the ski edge 21. With guide surface 9 disposed against the side edge of the ski, the file in the holder can be accurately moved backward and forward across edge 21, thereby resharpening the edge. When the file becomes worn, it can easily be replaced or simply turned over. Replacement is simple and quick because of the single fastener such as the countersunk screw 7 shown in FIG. 1.

As indicated in FIG. 2, if a bolt 7' is employed, clips 16 can be used to prevent longitudinal motion of the file with respect to the holder. As indicated in FIG. 2, the clip constitutes an elongated metal strip having ends curving around the ends of leg 5 so as to come in contact with the ends of the file 6, the file being selected to be of approximately the same length as leg 5. The clip structure extends along the outer surface of leg 5 and is held in place by fasteners such as screws 17. It will be observed that the clip structure need not be removed when replacing or turning the file.

The handle 12 can be constructed as an integrally formed holding member as shown in FIG. 3 somewhat similar to the back of a brush. Grooves 12'' can be provided in both sides for a better grip. The holder itself can be manufactured in any size convenient and suitable for use with specific types of skis, although the handle must be of a size suitable to provide a firm grip.

Figure 5:
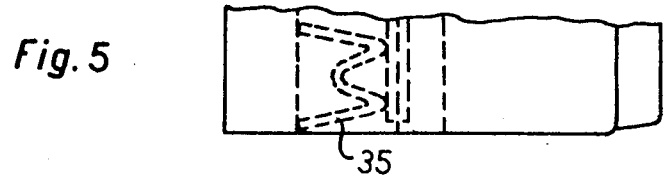
FIG. 5 is a top plan view of the apparatus of FIG. 4.
Figure 6:
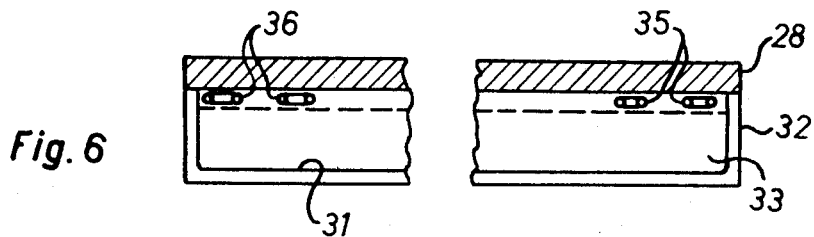
FIG. 6 is a sectional view along lines VI—VI of FIG. 4.

FIGS. 4-6 show a further embodiment of an apparatus according to the invention wherein the body 25 of the sharpening device is formed in a U-shape with a long leg 26, a short leg 27 and a transverse interconnecting portion 28. A handle 29 extends perpendicularly from the outer surface of leg 26 and can be regarded as constituting an extension of portion 28, the entire body being integrally formed as a single unit. The handle 29 also serves as a support for an elongated scraper blade 30 which is fixedly attached to the distal end of handle 29 as by molding the scraper in a recess in the end of the handle.

The inwardly facing surface of leg 26 is provided with an elongated relatively shallow recess 31 which is surrounded on three sides by a rim or wall 32, the fourth side of the recess being defined by the inwardly facing surface of portion 28. Recess 31 receives a file 33, the recess being shallower than the thickness of the file to permit the file to protrude slightly therefrom. The file is retained in the recess by M-shaped springs 35 and 36 with the distal ends of the legs of the springs being in contact with the inwardly facing surface 37 of leg 27. Surface 37 can be provided with small recesses to receive the leg ends, the peaks of the springs being in frictional engagement with the exposed file surface. Either one spring or two springs can be employed, two being illustrated in the embodiment shown in FIGS. 4-6.

It will be observed that leg 26 is dimensioned so that it is sufficiently longer than leg 27 to permit an active portion of the file, indicated in FIG. 4 by the dimension X, is exposed beyond the distal end of leg 27, this being the portion of the file intended to contact the edge of the ski being sharpened. The dimension X corresponds to the width of the ski edge which is, in modern skis, commonly in the order of 2 millimeters. It will be observed that the file, which is normally provided with cutting edges on both of its major surfaces, can be employed in four different positions, two on each side.

The gap between the inner surfaces of legs 26 and 27 results in a highly advantageous structure which permits easy mounting of the file, location of the spring means for retaining the file in recess 31 and facilitation of the guiding of the tool. As mentioned above, since the ski edge surface and the side face of the ski are not always in a right angle relationship, the provision of this gap and the exposure of a small edge of the file permits slight tilting of the tool in order to adapt it to the actual position of the ski edge surface.

The provision of a scraper at the end of the handle, in this single tool, permits removal of ice or snow from the ski edge surface before filing.

While certain advantageous embodiments have been chosen to illustrate the invention, it will be understood by those skilled in the art that various changes and modifications can be made therein without departing from the scope of the invention as defined in the appended claims.

What is claimed is:

1. An apparatus for sharpening edges, particularly the edges of skis, comprising
 a file; and
 a holder for said file comprising
 an elongated body having a cross-section in substantially the shape of a U with one leg of the U being longer than the other, said longer leg including
 means defining an elongated recess extending inwardly in the inner surface of the longer leg of said body to receive said file, the depth of said recess being less than the thickness of said file,
 the distal end surface of the other, shorter leg of the U constituting a guide surface for the file;
 means for removably attaching said file to the inwardly facing surface of the longer leg of the U of said body with the long dimension of said file extending parallel to the long dimension of said body, said means including
 spring means extending between the inwardly facing surface of said shorter leg and said file; and
 handle means attached to an outwardly facing surface of said body for manually manipulating said body.

2. An apparatus according to claim 1 wherein said handle means is integrally formed with said body and extends substantially perpendicularly from the outer surface of said longer leg at the base of the U.

3. An apparatus according to claim 2 and further comprising a scraper mounted on the distal end of said handle means.

4. An apparatus according to claim 1 wherein said means defining an elongated recess includes first and second end walls formed on said body defining the ends of said recess so that the long dimension of said recess is less than the long dimension of said body.

* * * * *